US008843536B1

(12) United States Patent    (10) Patent No.: US 8,843,536 B1
Elbaz et al.    (45) Date of Patent: Sep. 23, 2014

(54) METHODS AND SYSTEMS FOR PROVIDING RELEVANT ADVERTISEMENTS OR OTHER CONTENT FOR INACTIVE UNIFORM RESOURCE LOCATORS USING SEARCH QUERIES

(75) Inventors: Gilad Israel Elbaz, Santa Monica, CA (US); Kenneth Bronson, Federal Way, WA (US)

(73) Assignee: Google Inc., Mountain View, CA (US)

( * ) Notice: Subject to any disclaimer, the term of this patent is extended or adjusted under 35 U.S.C. 154(b) by 1595 days.

(21) Appl. No.: 11/026,680

(22) Filed: Dec. 31, 2004

(51) Int. Cl.
    *G06F 7/00*      (2006.01)
    *G06F 17/00*      (2006.01)
    *G06F 17/30*      (2006.01)

(52) U.S. Cl.
    CPC ................. *G06F 17/30864* (2013.01)
    USPC ............ 707/899; 709/223; 705/26.1

(58) Field of Classification Search
    CPC .................................. G06F 17/30864
    USPC .......... 709/217, 223, 224, 226, 206; 707/3, 4, 707/100, 101, 200; 705/26
    See application file for complete search history.

(56) References Cited

U.S. PATENT DOCUMENTS

| | | | |
|---|---|---|---|
| 4,839,853 A | 6/1989 | Deerwester et al. | |
| 5,325,298 A | 6/1994 | Gallant | |
| 5,499,360 A | 3/1996 | Barbara et al. | |
| 5,619,709 A | 4/1997 | Caid et al. | |
| 5,778,363 A | 7/1998 | Light | |
| 5,778,364 A | 7/1998 | Nelson | |
| 5,845,278 A | 12/1998 | Kirsch et al. | |
| 5,933,822 A | 8/1999 | Braden-Harder et al. | |
| 5,966,686 A | 10/1999 | Heidorn et al. | |
| 6,006,222 A | 12/1999 | Culliss | |
| 6,014,665 A | 1/2000 | Culliss | |
| 6,029,192 A * | 2/2000 | Hill et al. ............ | 709/206 |
| 6,044,375 A | 3/2000 | Shmueli et al. | |
| 6,067,552 A | 5/2000 | Yu | |
| 6,076,051 A | 6/2000 | Messerly et al. | |
| 6,078,916 A | 6/2000 | Culliss | |
| 6,119,164 A | 9/2000 | Basche | |
| 6,134,532 A | 10/2000 | Lazarus et al. | |
| 6,182,068 B1 | 1/2001 | Culliss | |

(Continued)

FOREIGN PATENT DOCUMENTS

| | | |
|---|---|---|
| EP | 0621542 B1 | 10/1994 |
| EP | 1014276 A2 | 6/2000 |
| EP | 1160686 | 12/2001 |
| WO | WO 00/79436 | 12/2000 |

OTHER PUBLICATIONS

U.S. Appl. No. 09/493,701, filed Jan. 28, 2000, Weissman, et al.

(Continued)

*Primary Examiner* — Susan Chen
(74) *Attorney, Agent, or Firm* — Fish & Richardson P.C.

(57) ABSTRACT

Methods and systems for providing relevant content for inactive uniform resource locators are described. One method described comprises receiving at least one request for a web page associated with an inactive URL, providing a first web page comprising at least one of a search field and a suggested search query in response to the at least one request, receiving at least one search query, receiving another request for a web page associated with the inactive URL, selecting content based at least in part on the at least one search query, and providing a second web page comprising the content in response to the another request.

24 Claims, 7 Drawing Sheets

(56) References Cited

U.S. PATENT DOCUMENTS

| | | | |
|---|---|---|---|
| 6,185,559 | B1 | 2/2001 | Brin et al. |
| 6,269,361 | B1 | 7/2001 | Davis et al. |
| 6,272,456 | B1 | 8/2001 | de Campos |
| 6,285,999 | B1 | 9/2001 | Page |
| 6,289,342 | B1 | 9/2001 | Lawrence |
| 6,289,353 | B1 | 9/2001 | Hazlehurst et al. |
| 6,298,348 | B1 | 10/2001 | Eldering |
| 6,314,419 | B1 | 11/2001 | Faisal |
| 6,324,519 | B1 | 11/2001 | Eldering |
| 6,389,467 | B1 * | 5/2002 | Eyal ............................... 709/223 |
| 6,421,675 | B1 | 7/2002 | Ryan et al. |
| 6,453,315 | B1 | 9/2002 | Weissman et al. |
| 6,493,702 | B1 | 12/2002 | Adar et al. |
| 6,526,440 | B1 | 2/2003 | Bharat |
| 6,529,903 | B2 | 3/2003 | Smith et al. |
| 6,615,209 | B1 | 9/2003 | Gomes et al. |
| 6,658,423 | B1 | 12/2003 | Pugh et al. |
| 6,678,681 | B1 | 1/2004 | Brin |
| 6,714,939 | B2 | 3/2004 | Saldanha et al. |
| 6,725,259 | B1 | 4/2004 | Bharat |
| 6,738,764 | B2 | 5/2004 | Mao et al. |
| 6,754,873 | B1 | 6/2004 | Law et al. |
| 6,766,320 | B1 | 7/2004 | Wang et al. |
| 6,810,375 | B1 | 10/2004 | Ejerhed |
| 6,826,559 | B1 | 11/2004 | Ponte |
| 6,910,003 | B1 | 6/2005 | Arnold et al. |
| 7,013,323 | B1 * | 3/2006 | Thomas et al. ................ 709/203 |
| 7,065,500 | B2 * | 6/2006 | Singh et al. ...................... 705/26 |
| 7,107,218 | B1 | 9/2006 | Preston |
| 2001/0034657 | A1 * | 10/2001 | Shuster et al. ................... 705/26 |
| 2002/0002450 | A1 | 1/2002 | Nunberg et al. |
| 2002/0042791 | A1 | 4/2002 | Smith et al. |
| 2002/0099700 | A1 | 7/2002 | Li |
| 2002/0123988 | A1 | 9/2002 | Dean et al. |
| 2002/0133481 | A1 | 9/2002 | Smith et al. |
| 2002/0165849 | A1 | 11/2002 | Singh et al. |
| 2003/0126235 | A1 | 7/2003 | Chandrasekar et al. |
| 2004/0059708 | A1 | 3/2004 | Dean et al. |
| 2004/0119740 | A1 | 6/2004 | Change et al. |
| 2004/0122811 | A1 | 6/2004 | Page |
| 2005/0038861 | A1 * | 2/2005 | Lynn et al. ..................... 709/206 |
| 2005/0102274 | A1 * | 5/2005 | Chen ................................. 707/3 |

OTHER PUBLICATIONS

Applied Semantics, "Applied Semantics Launches Contextual Targeting Pay-For-Performance Ad Serving Solution", Applied Semantics—Press Release, Oct. 21, 2002, pp. 1.2, web page at http://www.appliedsemantics.com/ne/ne_pr_102102.html available via the Internet and printed on Aug. 18, 2003.

Applied Semantics, Inc.—Press Release, "Applied Semantics Launches News Series to Power Publishing", web page at http://www.appliedsemantics.com/ne/ne_pr_081302.html as available via the Internet and printed on Aug. 18, 2003.

"Applied Semantics News Series," pp. 1-4, brochure, no date.

Chi et al. "Context Query in Information Retrieval", Proceedings of the 14$^{th}$ IEEE International Conference on Tools with Artificial Intelligence, IEEE Comp. Soc, vol. Conf. 14, Nov. 2002, pp. 101-106.

"CIRCA Technology Overview," Applied Semantics White Paper. Jul. 2001, pp. 1-10.

Conerva—Products: Retrieval Ware, "RetrievaWare—Optimized Search Precision & Recall" web page at http://www.convera.com/products/rw_precisions.asp as available via the Internet and printed on Oct. 30, 2003.

Fellbaum, C., ed. "Word Net: An Electronic Lexical Database," Cambridge: The MIT Press, Mar. 1998, pp. 117-127, 285-303. P325.5. O38W67 1998.

Geller, M., "Quigo Signs Deal with Overture", *MediaDailyNews*, Aug. 13, 2003, web page at http://www.mediapost.com/dtls_dsp_news.cfm?newsID=215196 available via the Internet and printed on Sep. 21, 2004.

Koll, M.B., "Information Retrieval Theory and Design Based on a Model of the Users Concept Relations", Proceedings of the 3$^{rd}$ Annual ACM Conference on Research and Development in Information Retrieval, 1980, pp. 77-93.

"Ontology Usage and Applications", Applied Semantics Technical White Paper, Jul. 2001, pp. 1-15.

"Powerful Revenue Solutions for Online Publishers", Applied Semantics AdSense, pp. 1-2, brochure, no date.

Tengi, R.I., "Design and Implementation of the WordNet Lexical Database and Searching Software", in *WordNet: An Electronic Lexical Database*, Fellbaum C. ed., Cambridge: The MIT Press, Mar. 1998, pp. 105-127.

"Verity Introduces Customizable Industry and Enterprise Taxonomies", Verity, Nov. 17, 2003, pp. 1-2.

Voorhees, E.M., "Query Expansion Using Lexical-Semantic Relations", Proceedings of the 17$^{th}$ Annual ACM Conference on Research and Development in Information Retrieval, Aug. 1994, pp. 61-69.

Sullivan, D., "AlmondNet Debuts "Post-Search" Search Behavioral Ad Network" web page at http://searchenginewatch.com/searchday/article.php/3464811 as available via the Internet and printed on Feb. 10, 2005.

Kushmerick, N., "Wrapper induction: Efficiency and expressiveness," Artificial Intelligence, 2000, pp. 15-68, 118, Elsevier Science B.V.

Brin, S. et al., "The Anatomy of a Large-Scale Hypertextual Web Search Engine," 1998, Computer Science Department, Stanford University, Stanford, CA.

Laender, A. et al., "A Brief Survey of Web Data Extraction Tools," 2002, Department of Computer Science, Federal University of Minas Gerais, Belo Horizonte MG Brazil.

Kushmerick, N., "Finite-state approaches to Web information extraction," 2002, Computer Science Department, University College Dublin.

Kushmerick, N. et al., "Adaptive information extraction: Core technologies for information agents," 2002, Computer Science Department, University College Dublin.

Chang, Chia-Hui et al., "IEPAD: Information Extraction Based on Pattern Discovery," 2001, Dept. of Computer Science and Information Engineering, National Central University, Chung-Li, Taiwan.

Muslea, I. et al., "Hierarchical Wrapper Induction for Semistructured Information Sources," 1999, pp. 1-27, Kluwer Academic Publishers, the Netherlands.

Hsu, C. et al., "Generating Finite-State Transducers for Semi-Structured Data Extraction from the Web," Information Systems, 1998, pp. 521-538, vol. 23, No. 8, Elsevier Science Ltd., Great Britain.

Crescenzi, V. et al., "RoadRunner: Towards Automatic Data Extraction from Large Web Sites," Proceedings of the 27$^{th}$ VLDB Conference, 2001, Rome, Italy.

Freitag, D. et al., "Boosted Wrapper Induction," 2000, American Association for Artificial Intelligence.

White, M. et al., "Multidocument Summarization via Information Extraction," First International Conference on Human Language Technology Research (HLT), 2001.

Delort, J. et al., "Enhanced Web Document Summarization Using Hyperlinks," HT'03, Aug. 26-30, 2003, Nottingham, United Kingdom.

Barroso et al., "Web Search for a Planet: The Google Cluster Architecture," IEEE Computer Society, 2003, pp. 22-28.

Google, "News Results for Search Engines," web page at http://www.google.com/search?hl=en&ie=UTF-8&g,=search+engines, as available via the Internet and printed on Jul. 26, 2004.

Oztekin, U. et al., "Usage Meets Link Analysis: Towards Improving Site Specific and Intranet Search via Usage Statistics," Technical Report, Department of Computer Science and Engineering, University of Minnesota, May 24, 2004.

Czyzowicz, J. et al., "Evaluation of Hotlink Assignment Heuristics for Improving Web Access" Second International Conference on Internet Computing (IC '01), vol. 2, Jun. 25-28, 2001, pp. 793-799., Las Vegas, Nevada, CSREA Press.

Denoue, L. et al., "An annotation tool for Web browsers and its application to information retrieval," Syscom, University de Savoie, France.

(56) References Cited

OTHER PUBLICATIONS

Tauscher, L et al., "Revisitation Patterns in World Wide Web Navigation" ACM SIGCHI '97, Proceedings of the Conference on Human Factors in Computing Systems, held in Atlanta, Georgia, Mar. 22-27, ACM Press.
Terveen, L. et al., "A System for Sharing Recommendations," Communications of the ACM. vol. 40, No. 3, Mar. 1997.
Barrett, R. et al., "How to Personalize the Web," Proceedings of the ACM Conference on Human Factors in Computing Systems, 1997.
Kaasten, S. et al., "Designing an Integrated Bookmark/History System for Web Browsing," History Keeping in Computer Applications: A Workshop, held at Human-Computer Interaction Laboratory, University of Maryland, Maryland, Dec. 2, 1999.
Kaasten, S. et al., "Designing an Integrated Bookmark/History System for Web Browsing," Proceeding of the Western Computer Graphics Symposium, Mar. 26-29, 2000.
Kaasten, S. et al., "Integrating Back, History and Bookmarks in Web Browsers," In Extended Abstracts of the ACM Conference of Human Factors in Computing System (Chi '01), 2000.
Staab, S. et al., "An Annotation Framework for the Semantic Web," Proceedings of the First International Workshop on Multimedia Annotation, Tokyo, Japan. Jan. 30-31, 2001.
Middleton, S. et al., "Capturing Knowledge of User Preferences: Ontologies in Recommender System," Proceedings of the First International Conference on Knowledge Capture (K-CAP), Oct. 2001.
Li, W. et al., "PowerBookmarks: A System for Personalizable Web Information Organization, Sharing, and Management," Sigmod Conference 1999, pp. 565-567.
"A9.com>Company>What's New & Cool" web page at http://a9.com/-/company/whatsCool.iso, as available via the Internet and printed on Jul. 29, 2004.
"An Annotea Bookmark Schema" web page at http://www.w3.org/2003/07/Annotea/BookmarkSchema-200300707, as available via the Internet and printed on Sep. 28, 2003.
"Annotea: An Open RDF Infrastrcture for Shared Web Annotations" web page at http://www.w3.org/2001/Annotea/Papers/www10/annotea-www10.html, as available via the Internet and printed on Sep. 28, 2003.
Maarek, Y. et al., "Automatically Organizing Bookmarks per Contents," Fifth International World Wide Web Conference, Paris, France, May 6-10, 1996, at web page http://www.5conf.inria.fr/fich_html/papers/P37/Overview.html, as available via the Internet and printed on Sep. 28, 2003.
"bk2site" web page at http://bk2site.sourceforge.net/, as available via the Internet and printed on Sep. 28, 2003.

"BlinkPro: Powerful Bookmark Manager" web page at http://www.blinkpro.com/, as available via the Internet and printed on Sep. 28, 2003.
BookmarkTracker.com web page at http://www.bookmrktracker.com/, as available via the Internet and printed on Sep. 28, 2003.
FurlBeta What is Furl web page at http://www.furl.net/learnMore.jsp, as available via the Internet and printed on Jul. 29, 2004.
"iKeepBookmarks.com—A Web-Based Bookmark Manager" web page at http://www.ikeepbookmarks.com/, as available via the Internet and printed on Sep. 28, 2003.
"RSS 1.0 channel for bookmark sharing," from Dan Brickleyon Jan. 29, 2001 web page at http://lists.w3.org/Archives/Public/www-annotation/2001Jan.Jun/0002.html, as available via the Internet and printed on Sep. 28, 2003.
"Save This Hompage" Gourmet the Magazine for Good Living web page at http://www.savethis.clickability.com/saveThisApp?clickMap=displayHelp&helpID=, as available via the Internet and printed on Sep. 28, 2003.
Bharat, K, "SearchPad: Explicit Capture of Search Context to Support Web Search" web page at http://www9.org/w9cdrom/173/173.html, as available via the Internet and printed on Sep. 28, 2003.
"TinyURL.com—where tiny is better!" web page at http://tinyurl.com/, as available via the Internet and printed on Nov. 11, 2003.
washingtonpost.com, "Marking a New Tool for Surfers" web page at http://www.washingtonpost.com/ac2/wp-dyn/A132-2000Sep13?language=printer, as available via the Internet and printed on Sep. 28. 2003.
"ZNAIL—for easier living in a virtual world" web page at http://znail.com/, as available via the Internet and printed on Sep. 28, 2003.
Kaasten, S. et al., "How People Recognize Previously Seen WWW Pages from Titles, URLs and Thumbnails" In X. Faulkner, J. Finlay. F. Detienne (Eds) *People and Computers* XVI (*Proceedings of Human Computer Interaction 2002*), BCS Conference Series, 247-265, Spriger Verlag at web page http://www.cpsc.ucalgary.ca/grouplab/papers/2002/02-ThumbnailStudy.BHCl/abstract.html, as available via the Internet on Jul. 29. 2004.
Grefenstette, Gregory, "Comparing Two Language Identification Schemes", International Conference on Statistical Analysis of Textual Data, Dec. 11, 1995.
Kesmodel, David. "Thanks to Web Ads, Some Find New Money in Domain Names." The Wall Street Journal Online, Nov. 17, 2005. [Retrieved on Nov. 12, 2009] <Retrieved from the Internet: URL: http://online.wsj.com/public/article/SB113200310765396752-FYV6dsilRS0N1fsiVu>.
Webmaster World. "Google AdSense: What are domain parking websites." [Retrieved on Nov. 12, 2009] <Retrieved from the Internet: http://www.webmasterworld.com/forum89/3229.htm>.

\* cited by examiner

| Domain Name 502 | Search Queries 504 | Concepts 506 |
|---|---|---|
| FiftyCents | rap artist 522 | rap music |
| | muscial artists 524 | |
| | pop music 526 | |
| | rapper 528 | |
| | conversion rates 530 | money |

METHODS AND SYSTEMS FOR PROVIDING RELEVANT ADVERTISEMENTS OR OTHER CONTENT FOR INACTIVE UNIFORM RESOURCE LOCATORS USING SEARCH QUERIES

FIELD OF THE INVENTION

The present invention relates generally to uniform resource locator associations and, more particularly, to methods and systems for providing relevant advertisements or other content for inactive uniform resource locators using search queries.

BACKGROUND OF THE INVENTION

Users of an Internet browser may enter an inactive Uniform Resource Locator ("URL") into the browser's address field. An inactive URL is a URL for which the user's Internet browser and/or a server on the Internet determine has no developed content associated with the URL. An inactive URL may contain a parked domain name, an error domain name, or an error page address. A parked domain name may refer to a registered domain name with no corresponding website where requests associated with the domain name are redirected to a service that attempts to provide advertisements or other content that may be of interest to the user. An error domain name may refer to a domain name that the user's Internet browser or a server on the Internet determines does not correspond to a website and generates an error message. An error page address may refer to a web page or file address contained in a URL for which a user's Internet browser or a server on the Internet determines no content exists at the address and generates an error message.

It is desirable to provide content, such as advertisements, to a user who enters an inactive URL. Conventional methods for providing a user with relevant content based on an inactive URL are limited. For example, such methods may provide generic results or rely only on an attempted interpretation of a domain name in the URL to identify relevant content to display.

SUMMARY

Embodiments of the present invention comprise methods and systems for providing relevant advertisements or other content for inactive URLs. One aspect of one embodiment of the present invention comprises receiving at least one request for a web page associated with an inactive URL, providing a first web page comprising at least one of a search field and a suggested search query in response to the at least one request, receiving at least one search query, receiving another request for a web page associated with the inactive URL, selecting content based at least in part on the at least one search query, and providing a second web page comprising the content in response to the another request. An inactive URL can include a parked domain name, an error domain name, or an error page address.

This illustrative embodiment is mentioned not to limit or define the invention, but to provide one example to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for providing relevant advertisements or other content for inactive URLs. There are multiple embodiments of the present invention. By way of introduction and example, one illustrative embodiment of the present invention provides a method for using search queries previously entered into a search field or selected on a web page associated with an inactive URL to select advertisements or other content for that inactive URL.

In one embodiment, an inactive URL is associated with a web page so that when a user enters the inactive URL into an address field of an Internet browser, the web page is provided. The web page contains advertisements. These advertisements are selected by comparing and matching keywords associated with the inactive URL with keywords associated with advertisements. Pricing information for the advertisements may also be considered when selecting the advertisements. If the advertisements interest the user, the user may click on one of the advertisements and proceed to another web page. The web page associated with the inactive URL also contains a search field that accepts search queries and contains suggested search queries to help the user locate relevant advertisements or web pages. Some users may find the originally displayed advertisements not relevant and not select them. Instead, these users may type in search queries in the web page's search field or select the suggested search queries. The search queries are recorded in a database or search log. After multiple users type in or select search queries in this manner, the search log includes search terms indicating the types of information these users seeking the inactive URL actually sought.

The search log may be used to select new keywords to associate with the inactive URL. These new keywords may be more closely related to content desired by visitors to the inactive URL web page. Thus, using the new keywords to select advertisements to include on the web page for the inactive URL can allow more interesting and relevant advertisements to be presented.

For example, an inactive URL including, for example, a parked domain name "fiftycents.com," may initially be identified as relating to a keyword "money." Based on the keyword "money," users may be presented with advertisements and other content relating to money in response to the parked domain name "fiftycents.com." Examples of such advertisements may include advertisements for conversion rates or for mutual fund investments. Users requesting the parked domain name "fiftycents.com" may not be interested in the advertisements relating to money however. They may have typed in the domain name "fiftycents.com" to access information about a rap music artist "50 cent". These users may thus enter search queries in the web page's search field or select suggested search queries trying to find information about the rap music artist named "50 cent." These search queries can include, for example, "rap star," "music by fifty cents," and other similar search queries that are stored in the search log. Embodiments of the present invention can use the search queries in the search log to identify that "rap music," for example, might be a better keyword to associate with the URL including the parked domain name "fiftycents.com," and future advertisements or other content displayed in response to a request for a URL including the domain name "fiftycents.com" can relate to the new keyword "rap music." Thus, the new advertisements are more likely to interest users who type in the domain name "fifty cents."

This introduction is given to introduce the reader to the general subject matter of the application. By no means is the invention limited to such subject matter. Illustrative embodiments are described below.

Overview of System Architecture

Figure 1:
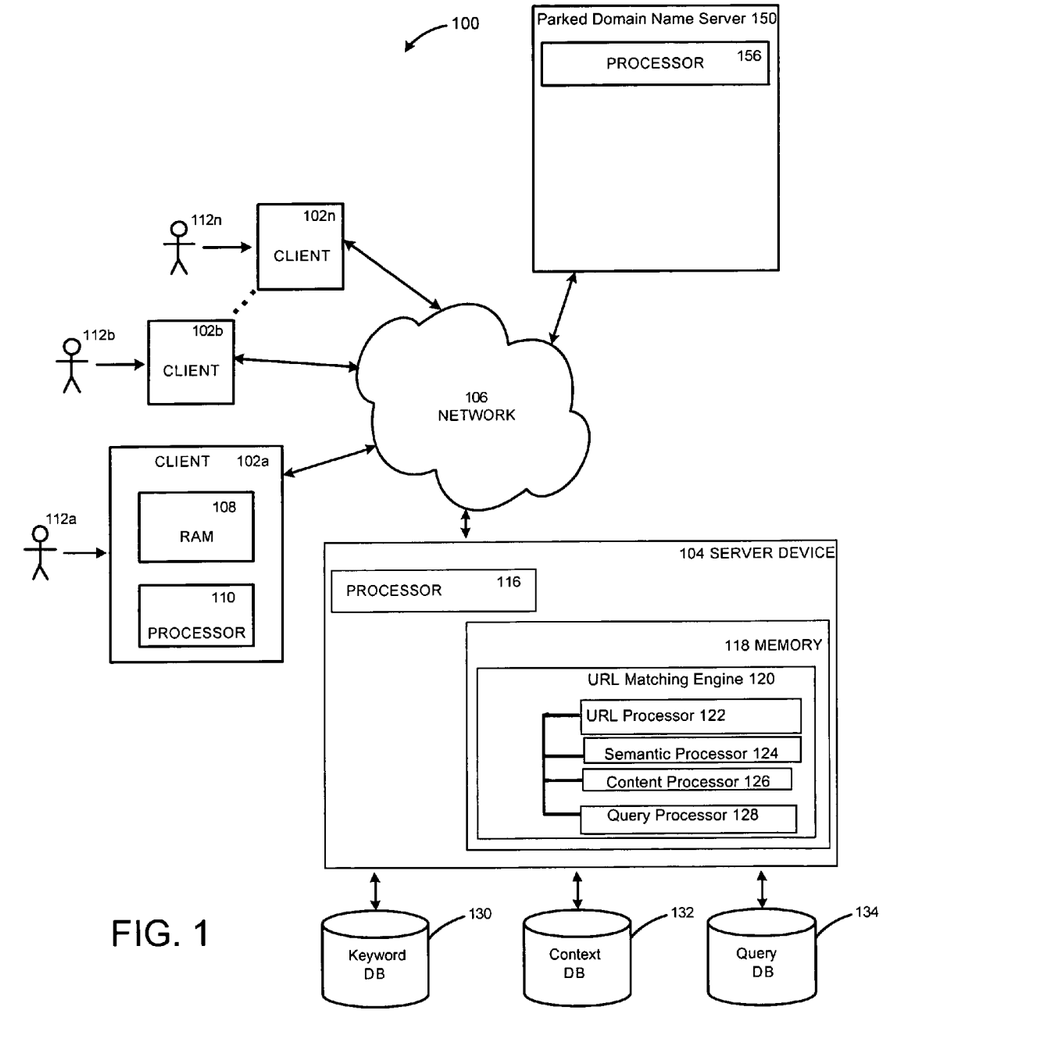
FIG. 1 shows a diagram of a system in accordance with one embodiment of the present invention.

Various systems in accordance with the present invention may be constructed. FIG. 1 is a diagram showing an illustrative system in which illustrative embodiments of the present invention may operate. The present invention may operate, and be embodied in, other systems as well.

Referring now to the drawings in which like numerals indicate like elements throughout the several figures, FIG. 1 is a diagram showing an illustrative environment for implementation of an embodiment of the present invention. The system 100 shown in FIG. 1 comprises multiple client devices 102a-n in communication with a content server device 104 and a parked domain name content server device 150 over a network 106. In one embodiment, the network 106 shown comprises the Internet.

According to the embodiment shown in FIG. 1, the user 112a can use the client device 102a to request content on the network 106 including content associated with an inactive URL. For example, the user 112a may type a desired URL containing a parked domain name into an address field of a web browser running on the client device 102a. Typically the user 112a will not know beforehand that the URL entered is an inactive URL. The web browser can send a request for an IP address for the URL over the network 106 and can receive an IP address for the parked domain name content server 150. According to one embodiment, the parked domain name content server 150 can redirect the request to the content server device 104. The content server device 104 may respond to the request by outputting a web page containing advertisements and other content or by outputting advertisements and other content relevant to the requested parked domain name as is discussed more fully below in connection with FIGS. 2-7.

In another example, a user can type in a desired URL containing an error domain name. A DNS server (not shown) in the network 106 may be unable to resolve the error domain name and return an error message to the client device 102a. Another server (not shown) on the network 106 or the client device 102a may use the error message to redirect the user's request to the content server device 104. The content server device 104 may respond to the request by outputting a web page containing advertisements and other content or by outputting advertisements and other content relevant to the requested error domain name as is discussed more fully below in connection with FIGS. 2-7. In still another example, a user can type in a desired URL containing an error page address. A server associated with the URL (not shown) on the network 106 may be unable to locate the error page address and return an error message to the client device 102a. Another server (not shown) on the network 106 or the client device 102a may use the error message to redirect the user's request to the content server device 104. The content server device 104 may respond to the request by outputting a web page containing advertisements and other content or by outputting advertisements and other content relevant to the requested as is discussed more fully below in connection with FIGS. 2-7.

In another embodiment, the request containing the inactive URL from a client device 102a is not redirected to the content server device 104. In this embodiment, another server on the network 106 sends a message, such as an XML message, to the content server 104 requesting content for the inactive URL. The content server 104 may respond to the message by identifying appropriate content and sending content to the server. The server can output this content on a web page, for example, and send it to the client device 102a.

System Architecture

Client Devices

Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, Mozilla Organization's Firefox, Apple Computer, Inc.'s Safari™, Opera Software's Opera Web Browser, and the open source Linux Browser.

Server Devices

Through the client devices 102a-n, users 112a-n can communicate over the network 106 with each other and with other systems and devices coupled to the network 106. As shown in FIG. 1, a content server device 104 and a parked domain name content server device 150 are also coupled to the network 106. The content server device 104 can comprise a server executing a URL engine application program capable of matching content with a URL. Server device 150 can comprise a server to which a request for a URL containing, for example, a parked domain name is originally sent and can redirect the request to the content server device 104. The content server device 104 shown in FIG. 1 comprises a processor 116 coupled to a computer-readable memory, such as memory 118. Server devices 104 and 150, depicted as single computer systems, may be implemented as a network of computer processors. Examples of server devices 104, 150 are servers, mainframe computers, networked computers, processor-based devices, and similar types of systems and devices. Client processor 110, server processor 116 and server processor 156 can be any of a number of computer processors, as described above, such as processors from Intel Corporation of Santa Clara, Calif. and Motorola Corporation of Schaumburg, Ill.

Such processors may include a microprocessor, an ASIC, and state machines. Such processors include, or may be in communication with, media, for example computer-readable media, which stores program code or instructions that, when executed by the processor, cause the processor to perform actions. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry program code or instructions to a computer, including a router, private or public network, or other transmission device or channel, both wired and wireless. The instructions may comprise program code from any computer-programming language, including, for example, C, C++, C#, Visual Basic, Java, Python, Perl, and JavaScript. Program code running on the server devices may include web server software, such as the open source Apache Web Server and the Internet Information Server (IIS) from Microsoft Corporation.

URL Engine

Memory 118 of the content server device 104 contains a URL application program, also known as a URL matching engine 120. The URL matching engine 120 comprises a software application including program code executable by the processor 116 or a hardware application that is configured to facilitate matching content with a URL, such as an inactive URL including, for example, a parked domain name, an error domain name, or an error page address. The URL matching engine 120 illustrated in FIG. 1 comprises a URL processor 122, a semantic processor 124, a keyword knowledge database 130, a content processor 126, a content database 132, a query processor 128, and a query database also known as a query log 134. Each of these components is described briefly below and will be discussed in greater detail throughout the application and particularly in connection with FIG. 3.

The URL processor 122 is capable of identifying a URL contained within a request for content from the client device 102a and can parse the URL, including a domain name contained in the URL, received by the URL processor 122 into individual tokens. The semantic processor 124 can identify a keyword or several keywords indicating a concept relevant to the URL. In identifying a keyword associated with a URL, the semantic processor 124 can access the keyword knowledge database 130. The keyword knowledge database 130 can comprise a listing of keywords and in one embodiment can comprise an ontology of interrelated concepts. The ontology of interrelated concepts comprises a listing of concepts and terms associated with the concepts as well as links to other related concepts and terms.

The content processor 126 can provide an advertisement based on the keyword identified by the semantic processor 124 and can access the content database 132 which can store advertisement and other content information. Finally, the query processor 128 can receive search queries from users on a network such as the Internet, add the search queries to the search query log 134, and filter the search queries to help identify concepts or keywords associated with the search queries. According to one embodiment, the query processor 128 can communicate with a server executing a search engine application program, such as the Google™ search engine.

It should be noted that the present invention may comprise systems having different architecture than that which is shown in FIG. 1. For example, in some systems according to the present invention, content server device 104 may comprise a single physical or logical server. The system 100 shown in FIG. 1 is merely illustrative, and is used to help explain the illustrative systems and processes discussed below.

Illustrative Web Page Output

Figure 2:
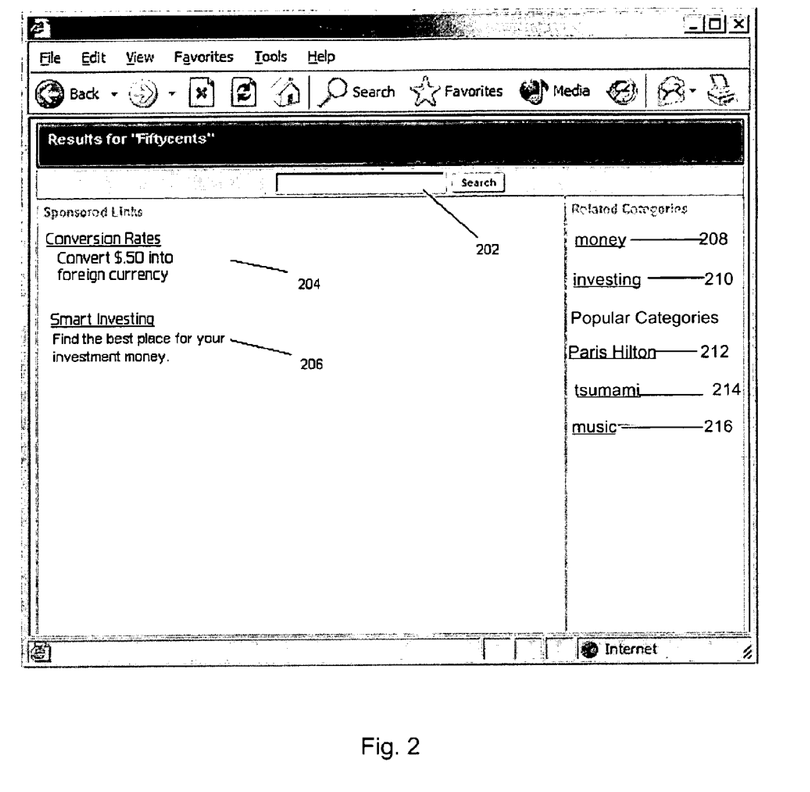
FIG. 2 shows an illustrative web page output according to one embodiment of the present invention.

FIG. 2 illustrates a web page 200 that can be output by or generated based on output from the content server device 104 according to one embodiment of the present invention when a request for an inactive URL is received. The web page 200 includes a search field 202, and content, such as links to other web pages, or advertisements 204 and 206, which are responsive to the inactive URL. The web page 200 may also include suggested search queries 208, 210, 212, 214, and 216. For example, the web page 200 shown in FIG. 2 can be output in response to a user entering an inactive URL containing the parked domain name "fiftycents.com." Advertisements 204 and 206 can display content based on a keyword "money" determined to be relevant to the parked domain name "fiftycents.com." The suggested search queries 208, 210, 212, 214, and 216 can be presented on the web page 200 and selected by a user to search for additional content. The suggested search queries 208 and 210 can be identified and displayed on web page 200 based on the keyword "money" determined to be relevant to the parked domain name or can be general popular search queries 212, 214, and 216. The search field 202 can be presented on the web page 200 to allow users viewing the advertisements 204 and 206 to enter a search query to search for additional content, if the provided advertisements are not interesting to the user.

Illustrative Process for Providing Relevant Advertising Content

Figure 3:
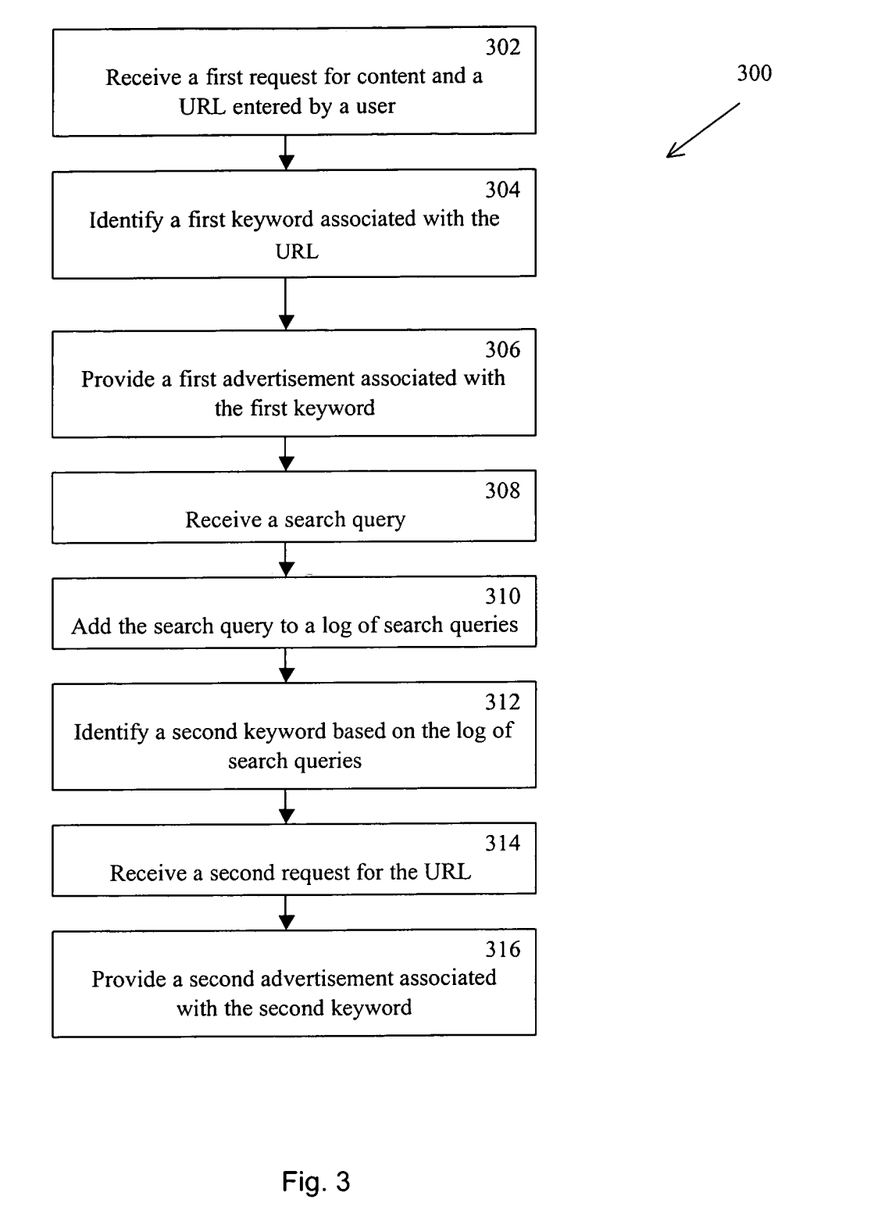
FIG. 3 shows one embodiment of an illustrative method according to one embodiment of the present invention.

Various methods in accordance with embodiments of the present invention may be carried out. FIG. 3 illustrates an illustrative method 300 for improving content displayed in response to a request for inactive URL. This illustrative method is provided by way of example, as there are a variety of ways to carry out methods according to the present invention. The method 300 shown in FIG. 3 can be executed or otherwise performed by one or a combination of various systems. The system shown in FIG. 1 and described above is used for illustration purposes.

The illustrative method 300 begins in block 302 where the URL processor 122 receives a request for content and identifies from the request a URL entered by the user 112a. The URL can be an inactive URL for which content is not currently available and include, for example, a parked domain name, an error domain name, or an error page address. For example, the user 112a can type, or otherwise enter, a URL http://www.FiftyCents.com into the address field of a web browser application on the client device 102a. The client device 102a can request an IP address for the URL entered by the user 112a from a DNS server. If FiftyCents.com is a parked domain name, a DNS server on the network 106 can identify the IP address of the parked domain name content server 150, and the client device 102a can then send a request for a web page to the server device 150.

The server device 150 is a parked domain name content server device, as described above. According to one embodiment, the server device 150 can then redirect the user's request for the parked domain name FiftyCents.com to the server device 104 using, for example, an HTTP status code 301 or 302 redirect.

In the example above, if the domain name FiftyCents.com is an error domain name, then a DNS server may be unable to resolve the domain name and return an error message to the client device 102a. An error message may be generated if the URL includes an error page address that cannot be located by a web server. A server on the network 106 or the client device 102a may receive the error message generated for an error domain name or an error page address and redirect the user's request for the error domain name or error page address to the server device 104.

The user's request includes the inactive URL entered by the user. The URL processor 122 located on the server device 104 receives the request and identifies from it the URL entered by the user 112a. The URL processor 122 can identify from the URL the parked domain name, error domain name, or error page address typed by the user 112a by, for example, parsing the URL.

After receiving a request for content and identifying a URL associated with the request, the illustrative method 300 proceeds to block 304 wherein the semantic processor 124 (described above) identifies at least a first keyword related to the URL. The keyword related to the URL can comprise, for example, a word, term, or concept useful for identifying the subject matter most likely associated with the URL. For example, if the URL received includes the domain name "fiftycents.com," the semantic processor 124 can identify a keyword of "money," identifying that the requested URL is likely associated with the concept of money.

Figure 4:
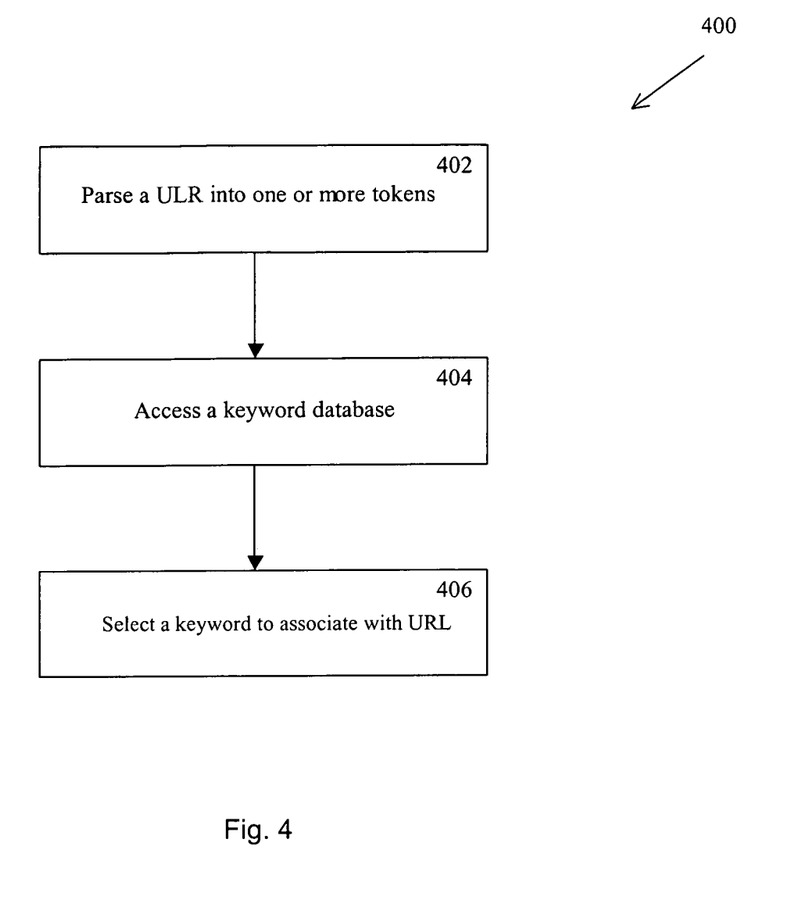
FIG. 4 shows one embodiment of another illustrative method according to one embodiment of the present invention.

FIG. 4 shows in greater detail one illustrative method 400 for identifying a keyword associated with a URL. The method 400 begins in block 402 wherein the URL is parsed into individual tokens. Various methods can be used to parse the URL including a domain name into tokens, such as the segmentation techniques described in PCT International Patent Application No. PCT/US03/31609, entitled "Methods and Systems for Text Segmentation" filed Dec. 30, 2003, which is hereby incorporated in its entirety by this reference. Generally speaking, parsing or segmenting a URL can comprise breaking up the URL or the domain name included in the URL into individual words or tokens. For example, for the domain name "fiftycents.com," parsing the domain name can comprise identifying individual words such as "fifty" and "cents." Parsing the URL can be performed by the URL processor 122. By parsing the URL, the semantic processor 124 can better identify a keyword properly reflecting the concept or idea associated with the URL.

Once the URL is parsed into individual tokens, the method 400 proceeds to block 404, wherein the semantic processor 124 can access a keyword knowledge database 130, such as a keyword ontology, to identify possible keywords associated with the token or tokens comprising the URL. According to one embodiment, the keyword knowledge database 130 may employ various methods for storing keyword and related semantic data in a suitable structure such as an ontology of interrelated concepts.

Identifying a keyword can also comprise identifying a keyword most closely associated with multiple tokens or words within a URL. For example, a URL including a domain name "jaguarsinzoos.com" can be identified by the URL processor 122. The semantic processor 124 can then parse the domain name and identify that the domain name "jaguarsinzoos.com" comprises three separate words—"jaguars," "in," and "zoos"—and the phrase—"jaguars in zoos." The semantic processor 124 can access the keyword knowledge database 130, for example, to identify concepts associated with each of the individual words or with the entire phrase.

The semantic similarity between the individual words and concepts in the keyword knowledge database 130 may be determined and used to identify appropriate concepts. For example, the keyword ontology may identify that the term "jaguar" is semantically similar to the concepts of animals, football, and luxury cars and that the word "zoo" is semantically similar to the concepts of recreational facilities and animals, for example. Once the semantic processor 124 accesses the keyword knowledge database 130 and identifies possible keywords associated with the domain name, an appropriate keyword can be identified in block 406. For example, based on the common concept "animals" associated with both the term "jaguar" and the term "zoo", the semantic processor 124 in this example can identify that "animals" is the best keyword to associate with the domain name "jaguarsinzoos.com." Alternatively, the semantic similarity between the entire phrase and concepts in the keyword knowledge database 130 may be used to identify an appropriate keyword to associate with the URL.

As show in the above example, words may have multiple meanings, which can present a challenge in associating related keywords. Words sense disambiguation may be used to determine the correct meaning of a word to use by using context to extract the sense or the meaning of a word. Further discussion of disambiguation can be found in U.S. patent application Ser. No. 10/690,328, entitled "Methods and Systems for Understanding a Meaning of a Knowledge Item Using Information Associated with the Knowledge Item," filed Oct. 21, 2003, which is hereby incorporated in its entirety by this reference. Determining the semantic similarity between a word or phrase and a keyword may be based at least in part on the meanings of the words.

Meanings of words may be represented by entries in an ontology as described above. Alternatively, meaning may be represented using statistical methods. Statistical methods may use an automated process of breaking down all of the meanings of the involved words into a discrete set of topics or concepts. For example, the method of Latent Semantic Analysis may be used. Latent Semantic Analysis is based on the idea that the aggregate of all the word contexts in which the word does and does not appear provides a set of mutual constraints that largely determines the similarity of the meaning of words and sets of words to each other. The Latent Semantic Analysis method can start with a training corpus of documents, and then can use Singular Value Decomposition on a matrix of word-document occurrence data to extract the most important topics or concepts that are represented by weighted word clusters. The weighted word clusters associated with the identified most important topics or concepts can be used to associate a keyword as discussed in block 406. For example, the weighted word clusters can be used to associate an URL containing the phrase "jaguars in zoos" and a new keyword "jaguars in africa", which both refer to a common topic relating to jaguar the animal.

In block 406, a keyword is selected as associated with the URL. For example, one or more of the methods described in block 404 above can be used to identify potential keywords to associate with a URL. These methods can also be used to select a keyword to associate with the URL.

Alternatively, a classifier can be used to associate a keyword with a URL. The classifier can take an input such as "jaguars in zoos" and then choose the most appropriate categories as defined by a taxonomy. For the example "jaguars in zoos" above, the categories "animals", "jaguars", "wild animals", or "zoos" may be chosen by the classifier. These categories can be used directly as keywords or can be used to select other keywords, which are also classified into the same categories. There are many methods of building a classifier or classification system. One common approach is building a Bayesian Classifier by training on a set of example keywords or phrases for each category.

It will be appreciated that the examples above merely provide examples of ways in which a keyword can be associated with a URL. Other suitable methods for associating a keyword with a URL may be used according to various embodiments of the present invention.

Returning to FIG. 3, once a keyword associated with the URL is identified 304, the illustrative method 300 proceeds to block 306 wherein a content processor 126 provides an advertisement, link to a web page, or other suitable content associated with the keyword. In order to identify an advertisement associated with the keyword, the content processor 126 can access a content database 132. Identifying an advertisement to associate with the keyword identified by the keyword processor may be based on cost factors associated with the advertisements as well as a match with the keyword identified in block 306. For example, advertisers can be allowed to bid on an amount they are willing to pay each time an advertisement is selected by a user. This amount can be referred to as a "cost-per-click." A cost-per-click can be associated with each advertisement and can be one factor in selecting which advertisement to display in connection with a keyword associated with a URL. For example, an advertisement with a high cost-per-click that is a close match with the keyword identified in block 306, may be selected over an advertisement that provides an even closer match but that has a lower cost-per-click associated with it.

Providing an advertisement associated with the first keyword can comprise outputting a web page such as the illustrative web page shown in FIG. 2 including advertisements 204 associated with the keyword together with a search field 202 configured to receive a search query. For example, for the domain name "fiftycents.com," the semantic processor 124 may identify a keyword "money" associated with the domain name "fiftycents.com." The content processor 126 can then display advertisements related to money, financial institutions, banking, etc. based at least in part on matching the keyword "money" with an advertisement. Matching the keyword with an advertisement can include comparing the keyword with a second keyword associated with the advertisements stored in the content database 132. For example, the content database 132 can contain a group of advertisements relating to investing, foreign currency, and debt management. This group of advertisements can be associated with an advertising keyword "finances." Based on the similarity of the advertising keyword "finances" to the keyword "money" associated with the parked domain name "fiftycents.com," the content processor 126 can display one or more advertisements from the group relating to investing, foreign currency, and debt management. Suggested search queries may also be displayed on the web page, such as the search queries 208, 210, 212, 214 and 216 shown in FIG. 2. Alternatively, providing an advertisement associated with the first keyword can comprise outputting content, such as advertisements 204 and 206 shown in FIG. 2. The output content may be in the form of an XML message that may be used in part to generate a web page illustrated, for example, in FIG. 2.

However, a user entering the domain name "fiftycents.com" may have intended to receive information about a music artist with the name "50 cent," instead of information about money. In this case, the user can enter a search query into the search field 202 to find the desired content. For example, the user could enter a search query "rap artist 50 cent." In this way, the search field 202 allows a user to search for desired content without navigating away from the web page 200. The user may select a suggested query, such as "music" 216. If a search query has been entered or selected, the illustrative method 300 proceeds to block 308 wherein a search query is received by the query processor 128. Once the query processor 128 receives a search query, the query processor 128 can handle the search query according to standard techniques and can output search results to the user as may be known in the art. According to one embodiment, this may comprise identifying relevant documents, such as web pages, responsive to the search query, ranking the relevant documents according to relevancy or interest to the user, and outputting or causing the display of links to the relevant documents in the ranking order. The query processor can also output and cause the display of advertisements and other content based on the search query.

Figure 5:
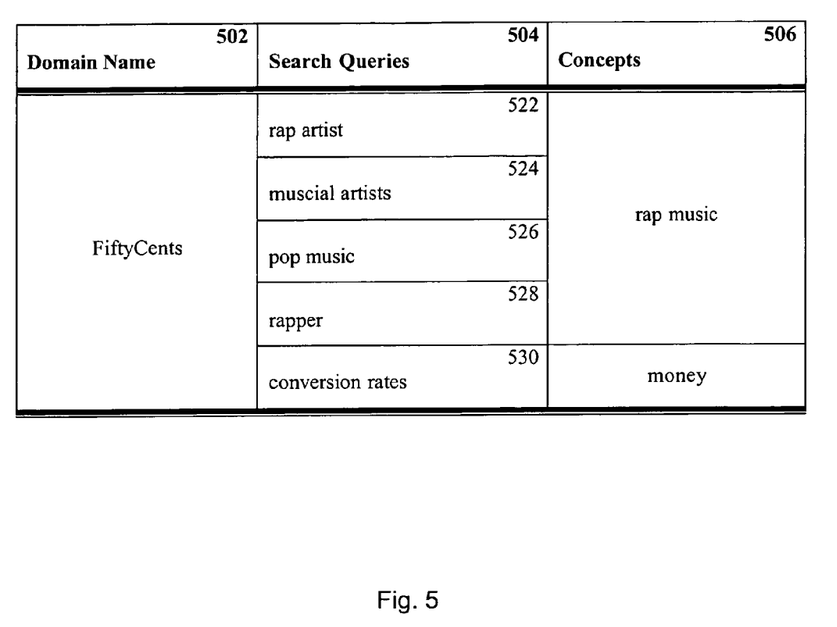
FIG. 5 shows one embodiment of an illustrative search query log as may used by one embodiment of the present invention.

After the search query is received, the query processor 128 can add the search query to a log of search queries as illustrated in block 310. The log of search queries may include multiple input search queries entered by multiple users over time into the search field displayed with the original web page—such as the one illustrated in FIG. 2—that is associated with the inactive URL. The log of search queries may further include multiple search queries selected by multiple users from suggested queries displayed with the original web page associated with the inactive URL. The queries can be stored in the search query log database 134. FIG. 5 shows one illustrative embodiment of a log of search queries 504 as may be stored in database 134. The log of search queries 504 can comprise a set of search queries received from the search field displayed with a web page output in response to a URL request. For example, over time, a number of users 112a-n may enter a URL containing the domain name "fiftycents.com" and be presented with advertisements relating to money. The users 112a-n may then enter or select search queries in order to find information about the rap music artist named 50 cent. The search queries can be added to the log of search queries 504 to generate a history of search queries received in connection with a domain name received in block 302. So, for example, over time, users 112a-n can enter and select search queries such as queries 522-528 shown in FIG. 5 for "rap artist," "muscial artists," "pop music," and "rapper" in order to locate desired content relating to a rap artist 50 cent.

Figure 6:
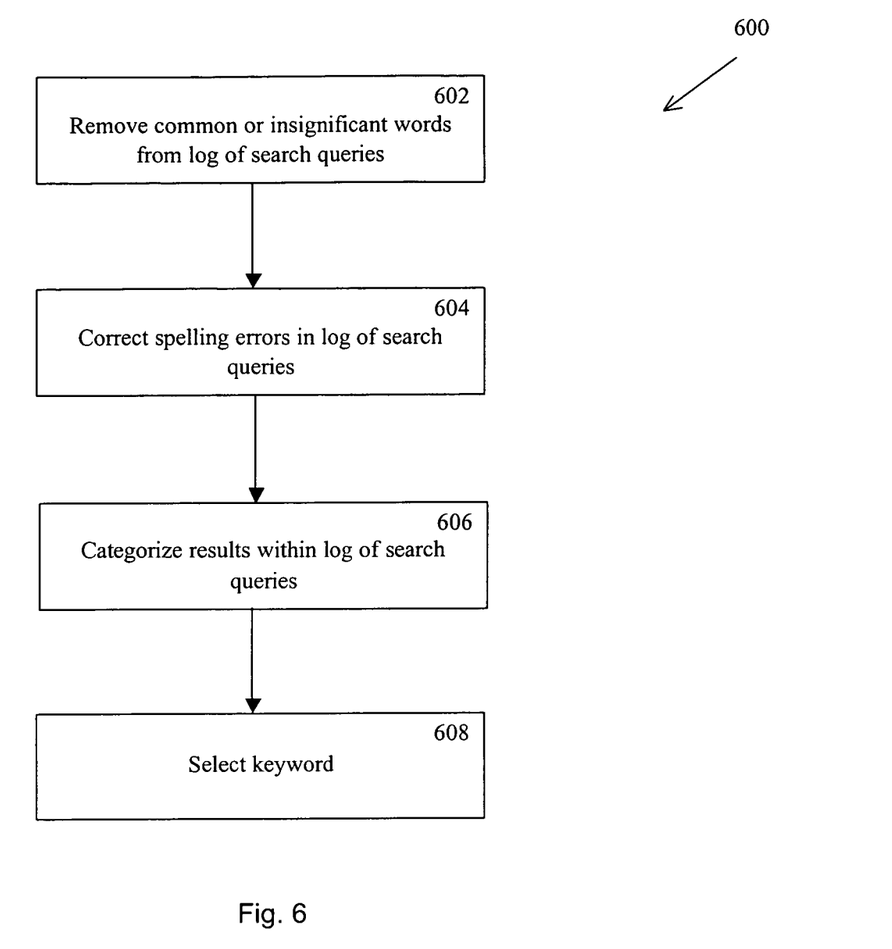
FIG. 6 shows one embodiment of another illustrative method according to one embodiment of the present invention.

Once the query processor 128 adds the search query to a log of search queries, the illustrative method 300 proceeds to block 312 wherein a second keyword is identified for the inactive URL based on the log of search queries 504. FIG. 6 shows an illustrative method 600 for identifying keywords from a log of search queries.

Referring to FIG. 6, the method 600 begins in block 602 wherein the semantic processor 124 removes common or insignificant words from the log of search queries. For example, common words such as "the," "of," "in," etc., may be removed from log of search queries to facilitate identifying important concepts of words contained in the log of search queries. In one embodiment, a statistical measure of commonness may be used to identify words that are not significant, and therefore may not be related. One statistical measure is similar to TF/IDF (Term Frequency/Inverse Document Frequency), in that it normalizes the number of times a term was queried on a given URL by dividing by the number of different URLs in which the term also was entered. Alternatively, normalization may be performed by dividing by the total number of times a term appeared in the log of search queries. This normalization may help filter certain words that users enter into search fields, but are unlikely to be related to the URL, for example, "google".

Once insignificant or common words are removed from the list of search queries, the method 600 proceeds to block 604 wherein spelling errors within the log of search queries are corrected. For example, in the search query log 504, search query 524 is for "muscial artists". Correcting spelling errors can thus comprise of replacing the term "muscial" with the proper spelling "musical". Correcting spelling errors can be facilitated by the use of a spell-checking engine also known as a spell checker. Correcting spelling mistakes can facilitate identifying key concepts or words contained in the log of search queries.

Once spelling errors are corrected the method 600 proceeds to block 606 wherein remaining terms within the log of search queries are categorized or mapped to related keywords. Categorizing queries within the log of a search queries can comprise, for example, identifying general concepts associated with multiple search queries entered by multiple users into the search field displayed on the web page associated with the URL. For example, for a URL containing the domain name "FiftyCents.com," search queries relating both rap music and currency conversion can be received from various users. For example, in FIG. 5, the search queries 522-530 include "rap artist," "muscial artists," "pop music," "rapper," and "conversion rate." Any of the methods described above in relation to FIG. 4, such as determining semantic similarity and categorization, may be used to associate the search queries in the log with a category or keyword. According to one embodiment, the semantic processor 124 can access an ontology of interrelated concepts in the keyword knowledge database 130 to identify concepts or keywords associated with each of the search queries. The ontology of interrelated concepts may indicate, for example, that the search queries 532-538 all related to the general concept of "rap music," and that the search query relates to a general concept of "money." In one embodiment, the semantic similarity between concepts or keywords and search queries may be performed by determining a semantic distance between a concept or keyword and a search query and/or determining a semantic sub-space containing the concept or keyword and the search query, such as by using the methods and systems described in U.S. Pat. No. 6,453,315 filed Nov. 1, 1999 entitled "Meaning-Based Information Organization and Retrieval," and U.S. patent application Ser. No. 09/493,701 filed Jan. 28, 2000 entitled "Meaning-Based Advertising and Relevance Determination," both of which are incorporated herein in their entirety by this reference.

Once the entries in the log of search queries are categorized or otherwise mapped to the most related keywords, the method proceeds to block 608, wherein a keyword is selected. Any of the methods described above in relation to FIG. 4, such as determining semantic similarity and categorization, may be used to select a keyword to associate with the URL. The difference between use of the methods described in relation to FIG. 4 and use of the methods in block 608 is that in block 608 a set of search queries are processed instead of a group of words or a phrase associated with the URL. Selecting a keyword based on the log of search queries can comprise, for example, identifying which categories of search queries are most popular, which categories of search requests are closest to advertisements with a high cost-per-click, or other suitable method for selecting a keyword. The frequency of a search query can be used to weight the importance of the search query as it is used to select a keyword. Click-through information associated with the keywords may also be used in selecting a keyword.

Returning to FIG. 3, once the semantic processor 124 identifies a second keyword associated with the requested URL in block 312, the illustrative method 300 proceeds to block 314 wherein a request for the same URL received in block 301 is again received. Receiving the request for the URL can be accomplished by the URL processor 122 in the same way the first request was received in block 302, or other suitable method. For example, another user could enter an inactive URL containing the domain name "fiftycents.com" on a client device located on the network 106 and the request can be sent over the network 106 to the URL processor 122.

Figure 7:
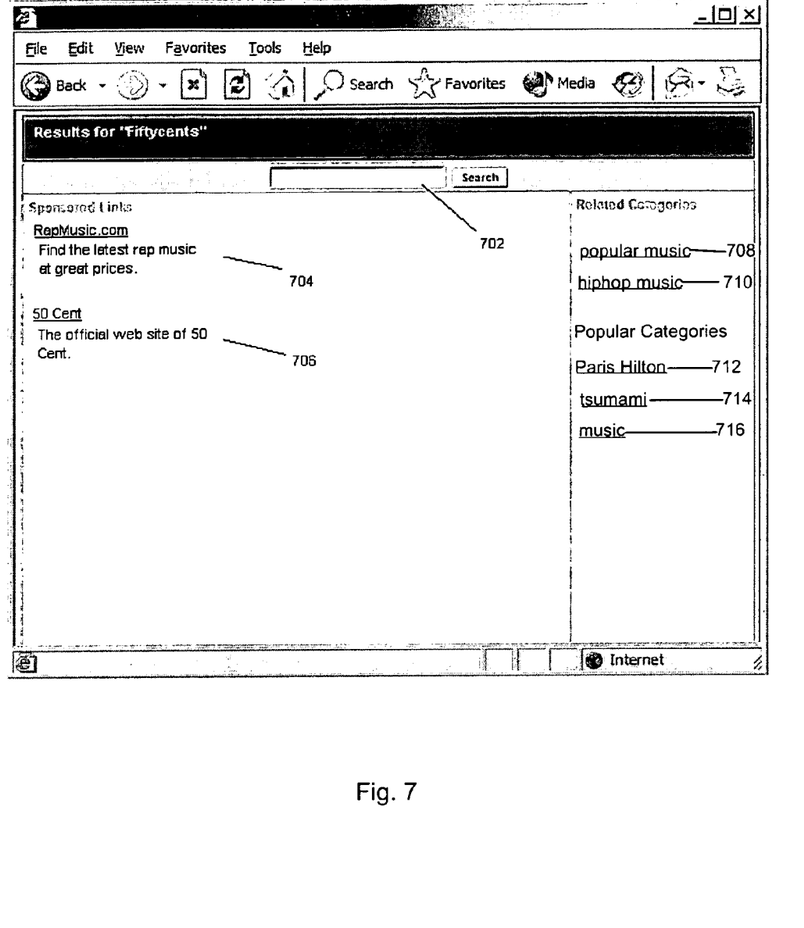
FIG. 7 shows another illustrative web page output according to one embodiment of the present invention.

Once a new request for the URL is received, the method 300 proceeds to block 316, wherein the content processor 126 provides a second advertisement, link to a web page, or other suitable content associated with the second keyword as shown in the illustrative web page 700 of FIG. 7. Web page 700 can be hosted by server device 104 or server device 104 can output content in, for example, an XML message, to another server device that can use the content to generate the web page 700. Web page 700, may include, for example, advertisements 704 and 706 that display content relating to rap music and the rap artist 50 Cent. Because the advertisements associated with the second keyword are influenced by the search queries entered or selected previously by users seeking the same URL, the second set of advertisements will more likely present content of interest to the user. For example, the second keyword associated with URL including the domain name "fiftycents.com" can be "rap music" instead of "money" based on the search queries relating to rap music. Advertisements based on the keyword "rap music" may be more likely to appeal to users looking for the domain name "fiftycents.com," and thus the second set of advertisements can have a higher selection rate. Web page 700 also may include suggested search queries 708, 710, 712, 714, and 716. Suggested search queries 708 and 710 may be selected based on the second keyword associated with the requested URL.

According to one embodiment, a selection rate—also known as a "click-through" rate—indicating the number of times a user has selected or clicked on an advertisement can be compared for the first advertisement associated with the first keyword and the second advertisement associated with a second keyword. The comparison of the click-through data for the first advertisement and the second advertisement can allow the semantic processor 124 to determine which of the first keyword and the second keyword generates more relevant advertisement displaying content of greater interest to users. For example, if only one out of every ten users who are presented with the first advertisement end up clicking on it, and 8 out of ten users who are presented with the second advertisement end up clicking on it, it can be determined that the keyword associated with the second advertisement more likely properly reflects the meaning of the parked domain name. Conversely, if the first keyword is deemed to be more relevant based on the click-through data, the second keyword can be ignored in a subsequent request for the URL in favor of the first keyword.

General

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. A computer-implemented method, comprising:
receiving, from a client device over a network, a first request that contains an inactive URL;
providing in response to receiving the first request, a first web page comprising at least one of a search field and a suggested search query;
receiving a search query associated with the first web page, wherein receiving the search query comprises at least one of a) receiving a query entered in the search field or b) receiving a user-selection of the suggested search query;
receiving a second request that requests a page using the inactive URL;
selecting content to provide in response to the second request based at least in part on the received search query; and
providing a second web page comprising the selected content in response to the second request,
wherein the inactive URL comprises a parked domain name that redirects a requester to a service that presents a webpage that presents advertising selections that are selected to correspond to keywords associated with the content of the inactive URL, an error domain name that does not correspond to an existing website, or an error page address that that does not correspond to an existing website.

2. The method of claim 1, further comprising receiving multiple search queries from multiple users, storing the multiple search queries in a query log, and selecting the content to provide in response to the second request based at least in part on the received multiple search queries.

3. The method of claim 1, further comprising selecting a relevant keyword for the inactive URL based at least in part on the search query; wherein selecting the content based at least in part on the search query comprises selecting the content based on the relevant keyword.

4. The method of claim 3, wherein the relevant keyword is selected based at least in part on a semantic similarity between the keyword and the search query.

5. The method of claim 4, wherein the keyword is selected based at least in part on a categorization of the keyword and the search query.

6. The method of claim 3, further comprising storing the search query.

7. The method of claim 6, wherein storing the search query comprises storing the search query in a log, and selecting the relevant keyword comprises accessing the log.

8. The method of claim 3, wherein selecting the content based on the relevant keyword comprises:
comparing the at least one relevant keyword to a plurality of keywords associated with a plurality of advertisements; and
selecting as the content at least one of the advertisements associated with at least one of the plurality of keywords that is similar to the at least one relevant keyword.

9. The method of claim 1, further comprising:
receiving a plurality of requests that contain the inactive URL;
providing in response a plurality of corresponding web pages that each comprise a search field or a suggest search query; and
receiving a plurality of search queries associated with two or more of the plurality of corresponding web pages;
wherein selecting content comprises selecting the content based at least in part on the received plurality of search queries.

10. The method of claim 1, wherein the first web page further comprises a first advertisement.

11. The method of claim 10, wherein the content based on the search query comprises a second advertisement, the second advertisement being different from the first advertisement.

12. The method of claim 11, further comprising:
determining a click-through rate for the first advertisement; and
determining a click-through rate for the second advertisement, wherein
selecting the content is further based on the determined click-through rate for the first advertisement and the determined click-through rate for the second advertisement.

13. The method of claim 1, further comprising:
parsing the inactive URL into at least one token; and
identifying at least one keyword associated with the at least one token,
wherein selecting the content is further based on the at least one keyword associated with the at least one token.

14. A computer-implemented method, comprising:
receiving, from a client device over a network, at least one request that includes a URL having a name of a parked domain;
providing output based on the inactive URL in response to the at least one request;
receiving at a computer server at least one search query from a first web page associated with the output, wherein receiving a search query comprises at least one of receiving an input search query from a search field on the first web page and receiving a suggested search query from the first web page; and
identifying a keyword for the inactive URL based at least in part on the at least one search query.

15. The method of claim 14, wherein receiving the at least one request for a web page associated with the inactive URL comprises receiving a plurality of requests for a web page associated with the inactive URL, receiving the at least one search query comprises receiving a plurality of search queries, and identifying the keyword comprises selecting the keyword based on the plurality of search queries.

16. The method of claim 14, further comprising receiving multiple search queries from multiple users, storing the multiple search queries in a query log, and identifying the keyword for the inactive URL based at least in part on the received multiple search queries.

17. The method of claim 14, further comprising using the keyword to select content to display in response to receiving another request for a web page associated with the inactive URL that is different than the at least one request previously received for a web page associated with the URL.

18. The method of claim 14, wherein providing output comprises providing content to display.

19. The method of claim 14, wherein providing output comprises providing the first web page comprising content associated with at least a portion of the inactive URL.

20. The method of claim 14, wherein the keyword is identified based at least in part on a semantic similarity between the keyword and the at least one search query.

21. The method of claim 14, wherein the keyword is identified based at least in part on a categorization of the keyword and the at least one search query.

22. A computer-readable storage device comprising instructions that, when executed, cause a processor to perform operations comprising:

receiving, from a client device, a first request containing an inactive URL;

providing over a network, in response to receiving the first request, a first web page comprising at least one of a search field and a suggested search query;

receiving a search query associated with the first web page, wherein receiving the search query comprises at least one of a) receiving a query entered in the search field or b) receiving a user-selection of the suggested search query;

receiving a second request that requests a web page using the inactive URL;

selecting content to provide in response to the second request based at least in part on the search query; and providing a second web page comprising the selected content in response to the second request, wherein the inactive URL comprises a parked domain name that redirects a requester to a service that presents a webpage that presents advertising selections that are selected to correspond to keywords associated with the content of the inactive URL, an error domain name that does not correspond to an existing website, or an error page address that that does not correspond to an existing website.

23. A system, comprising:

an input server interface to receive at least one request for a web page associated with an inactive URL;

an output server interface to provide output based on the inactive URL in response to the at least one request;

means for receiving at least one search query from a first web page associated with the output, including at least one of receiving an input search query from a search field on the first web page and receiving a suggested search query from the first web page; and means for identifying a keyword for the inactive URL based at least in part on the at least one search query;

wherein the inactive URL comprises a parked domain name that redirects a requester to a service that presents a webpage that presents advertising selections that are selected to correspond to keywords associated with the content of the inactive URL, an error domain name that does not correspond to an existing website, or an error page address that that does not correspond to an existing website.

24. A method, comprising:

receiving a parked domain name and parsing the domain name into at least one token;

accessing a keyword ontology to identify possible keywords associated with the token;

selecting a first keyword for the parked domain name based on the possible keywords associated with the token;

providing an advertisement associated with the first keyword within a web page, the web page further comprising a search field configured to receive a search query;

receiving a search query in the search field;

adding the search query to a log of search queries received in the search field;

filtering the log of search queries;

categorizing entries within the log of search queries into categories;

identifying at least a second keyword for the domain name based at least in part on the categories; and outputting a second advertisement based on the second keyword in response to a request for the domain name.

* * * * *